(12) United States Patent
Macklin et al.

(10) Patent No.: US 7,802,656 B2
(45) Date of Patent: Sep. 28, 2010

(54) METHOD AND APPARATUS FOR IMPROVING THE DELIVERY OF OIL OF A WICK LUBRICATING SYSTEM FOR A LOCOMOTIVE TRACTION MOTOR SUPPORT BEARING

(75) Inventors: John E. Macklin, Fremont, NE (US); Robert B. Foster, Erie, PA (US); Paul Bien, Downers Grove, IL (US)

(73) Assignee: Magnus Division of LV Ventures, Inc., Fremont, NE (US)

( * ) Notice: Subject to any disclaimer, the term of this patent is extended or adjusted under 35 U.S.C. 154(b) by 1288 days.

(21) Appl. No.: 11/336,039

(22) Filed: Jan. 20, 2006

(65) Prior Publication Data

US 2007/0169999 A1      Jul. 26, 2007

(51) Int. Cl.
*F16N 7/12* (2006.01)
(52) U.S. Cl. .................. 184/64; 384/399; 384/408; 384/409; 384/412; 184/102
(58) Field of Classification Search ............ 184/64; 384/399, 408, 409, 412; 417/211
See application file for complete search history.

(56) References Cited

U.S. PATENT DOCUMENTS

| | | | |
|---|---|---|---|
| 1,840,759 A * | 1/1932 | Wheeler ............... 417/211 |
| 2,062,250 A * | 11/1936 | Moller ................. 184/7.2 |
| 2,849,262 A * | 8/1958 | Wood, Jr. et al. ........ 384/468 |
| 2,980,472 A | 4/1961 | Harkenrider |
| 3,077,162 A * | 2/1963 | Banerian ............... 417/484 |
| 3,210,138 A | 10/1965 | Boller et al. |
| 3,662,858 A | 5/1972 | Peterson |
| 3,738,453 A * | 6/1973 | Boswell ................. 184/6.16 |
| 3,827,769 A | 8/1974 | Boller et al. |
| 3,905,659 A | 9/1975 | Renk et al. |

(Continued)

FOREIGN PATENT DOCUMENTS

WO  PCT/US2006/030007        5/2007

*Primary Examiner*—Bradley T King
*Assistant Examiner*—James K Hsiao
(74) *Attorney, Agent, or Firm*—Milton S. Gerstein; Much Shelist

(57) ABSTRACT

An improved wick-holder for mounting a felt lubricating wick is provided with a passive inertia-activated pump mounted for submersion in the axle-cap lubricant-reservoir at a level that ensures that for all levels of the reservoir, the pump inlet is submerged in the lubricant of the reservoir. In a first embodiment, the passive inertia-activated pump takes the form of a piston-type pump, while in a second embodiment, the passive inertia-activated pump takes the form of a diaphragm pump. In either embodiment, the inlet of the passive inertia-activated pump is submersed in the lubricant-reservoir, and the output of the passive inertia-activated pump is directed to the surface-interface between the felt wick and the axle journal surface-area to increase the lubrication thereof over and above that which normally ensues owing to the conventional capillary action of the felt wick. In a modification of the first embodiment, the piston pump is mounted to a splash sleeve forming part of the wick-holder and which is telescopingly received over the free end of the felt wick, with the output of the passive inertia-activated pump delivering the lubricant to the surface-interface between the felt wick and the axle journal surface-area via the hollow interior-volume of the splash sleeve and wick holder proper. The slosh pump of the invention may replace the wick assembly entirely, whereby the lubrication is achieved solely by the slosh pump of the invention.

11 Claims, 10 Drawing Sheets

U.S. PATENT DOCUMENTS

| | | | | |
|---|---|---|---|---|
| 3,911,659 A | * | 10/1975 | Mandl | 57/406 |
| 3,940,189 A | * | 2/1976 | Renk et al. | 384/408 |
| 4,077,492 A | * | 3/1978 | Inoue | 184/64 |
| 4,229,056 A | | 10/1980 | Renk | |
| 4,406,587 A | * | 9/1983 | Perry | 417/211 |
| 4,416,589 A | * | 11/1983 | Perry | 417/211 |
| 4,983,051 A | * | 1/1991 | Hibner et al. | 384/99 |
| 5,082,089 A | * | 1/1992 | Renk et al. | 184/64 |
| 6,299,421 B1 | * | 10/2001 | Oh et al. | 417/571 |
| 6,557,454 B2 | * | 5/2003 | Miyazawa | 92/71 |
| 6,631,651 B2 | * | 10/2003 | Petrzik | 74/346 |
| 7,509,937 B2 | * | 3/2009 | Hofbauer | 123/196 R |

* cited by examiner

PRIOR ART

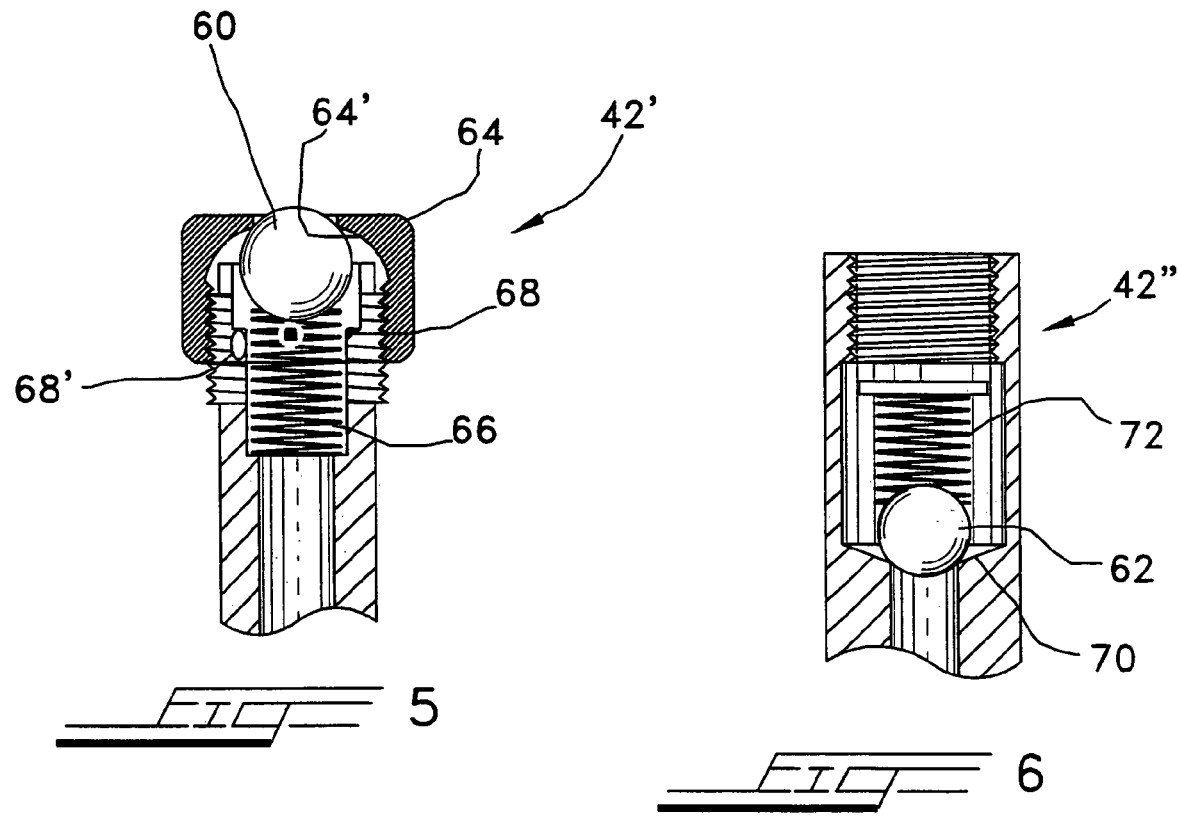
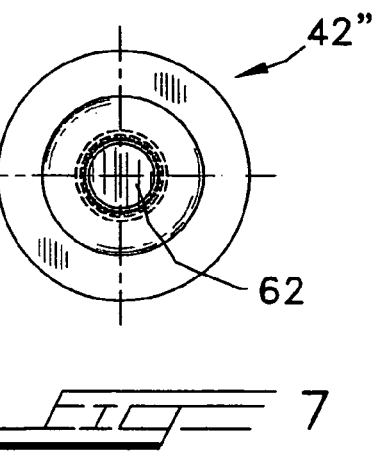

METHOD AND APPARATUS FOR IMPROVING THE DELIVERY OF OIL OF A WICK LUBRICATING SYSTEM FOR A LOCOMOTIVE TRACTION MOTOR SUPPORT BEARING

CROSS REFERENCE TO RELATED APPLICATION

Reference is had to co-pending application Ser. No. 11/284,635, filed on Nov. 21, 2005, which application is incorporated by reference herein.

BACKGROUND OF THE INVENTION

The present invention is directed to a method and apparatus for improving the oil delivery of a lubricating system for lubricating the axle-journal surface mounted in a support bearing of a locomotive traction motor. The oil-wick delivery system for lubricating the axle-journal surface mounted in a support bearing of a locomotive traction motor includes a wick holder that supports and mounts a central lubricating wick having a lower end portion or section received in an oil reservoir, which oil, via capillary action, is delivered by the wick to the axle-journal surface by means of a window formed in the shell of the traction motor support bearing. The other, upper wick-face section of the wick is received in the window for contact against the axle-journal surface, to thereby provide the proper lubrication.

Examples of this lubricating system are disclosed in the U.S. Pat. Nos. 2,980,472; 3,827,769; 3,905,659; 4,229,056; and 5,082,089. One such prior-art system is also shown in FIG. 1, and is indicated generally by reference numeral 10, and includes an oil reservoir 12 for storing lubricant, and a carrier assembly 14 connected to the axle cap 16 of a friction support bearing 18 used for mounting a locomotive traction motor to the wheel axle assembly. The carrier assembly 14 has a spring 22, such as a coil or torsion spring, that biases a wick-holder unit 34 toward a wick window, or lubricating opening, 26 formed in the shell of the friction support bearing 18, through which window oil is delivered to the axle-journal surface 37 mounted in the friction support bearing. The wick-holder unit consists of a slide bracket element or member 32 which is mounted for sliding movement in the carrier assembly 14, a wick holder member 34 of arcuate shape that is connected to the slide bracket element 32, and a felt wick 36 having an upper section of similar arcuate shape mounted in the wick holder 34. The wick defines a wick-face 36' that contacts the axle-journal surface 37.

In Applicants' above-mentioned co-pending application Ser. No. 11/284,635, there are disclosed various embodiments for increasing oil-wick lubrication for a friction support bearing of a locomotive traction motor by means of providing louver-reservoirs or reservoir-pockets that are formed either as part of the wick-holder or as part of a separate splash sleeve that is mounted over, and connected to, the lower end portion of the felt wick. These reservoir-pockets receive and store oil that has been splashed and sloshed in the main oil-wick reservoir during normal locomotive operation, to thereby temporarily store and delivery this captured oil to upper portions of the felt wick for enhanced lubrication by the felt wick. This enhanced lubrication by the felt wick has special relevance and advantage when the level of the oil of the main oil reservoir for the wick has been reduced to a minimum level.

In the non-pressure lubrication system of which the present invention is used, it would be highly beneficial to ensure that the proper rate of lubricant is delivered to the axle-journal surface mounted in the support bearing of the locomotive traction motor, so that a concomitant decrease of wear and tear and lengthening of the service life of the axle-journal surface-area occurs. The present invention is directed to providing such an optimal flow rate of lubricant to the axle-journal surface-area via face of the wick lubricator, independent of the oil level present in the reservoir between maximum and minimum service levels.

SUMMARY OF THE INVENTION

It is, therefore, the primary objective of the present invention to provide a supplemental lubricant-delivery system for enhancing the lubrication of the axle-journal surface-area by optimizing the amount of oil delivered to the face of the wick lubricator and, therefore, to the axle journal surface-area, which optimized oil-delivery is independent of the oil level present in the reservoir between maximum and minimum service levels.

It is, also, the primary objective of the present invention to provide such a supplemental lubricant-delivery system which incorporates a passive inertia-activated slosh pump located internally to the main axle-cap oil-reservoir.

It is another primary objective of the present invention to provide such a supplemental lubricant-delivery system which incorporates a passive inertia-activated pump located internally to the main axle-cap oil-reservoir, which pump is driven by the inertial resistance to the vertical and lateral accelerations imposed upon the traction motor by rail irregularities encountered during normal operation.

It is yet another primary objective of the present invention to provide such a supplemental lubricant-delivery system which incorporates a passive inertia-activated pump located internally to the main axle-cap oil-reservoir, which passive inertia-activated pump delivers the oil from the axle-cap oil-reservoir to a location close to the contact-face of the felt wick with the axle-journal.

In accordance with the present invention, an improved lubricating system for use with a wick-holder mounting a felt lubricating wick is provided with a passive inertia-activated pump mounted for at least partial submersion in the axle-cap lubricant-reservoir whereby at least the pump inlet is submerged in the lubricant of the reservoir. In a first embodiment, the passive inertia-activated pump takes the form of a piston-type pump, while in a second embodiment, the passive inertia-activated pump takes the form of a diaphragm pump. In either embodiment, the inlet of the passive inertia-activated pump is submersed in the lubricant-reservoir, and the output of the passive inertia-activated pump is directed to the surface-interface between the felt wick and the axle journal surface-area to increase the lubrication thereof over and above that which normally ensues from that owing to the conventional capillary action of the felt wick. In a modification of the first embodiment, the passive inertia-activated piston pump is mounted to a splash sleeve forming part of the wick-holder which is telescopingly received over the free end of the felt wick, with the output of the pump delivering the lubricant to the surface-interface between the felt wick and the axle journal surface-area interiorly via the hollow interior-volume of the splash sleeve and wick holder proper.

In another embodiment, the passive inertia-activated pump of the invention entirely replaces the prior-art wick-lubricating system, to be the only delivery source of lubricant to the surface-interface between the support bearing and axe journal.

BRIEF DESCRIPTION OF THE DRAWING

The invention will be more readily understood with reference to the accompanying drawings, wherein:

FIG. 5 a vertical cross-sectional view of the inlet of the slosh pump of FIG. 3;

FIG. 6 a vertical cross-sectional of the outlet of the slosh pump of FIG. 3;

FIG. 7 is a front view thereof;

DETAILED DESCRIPTION OF THE INVENTION

Figure 1:
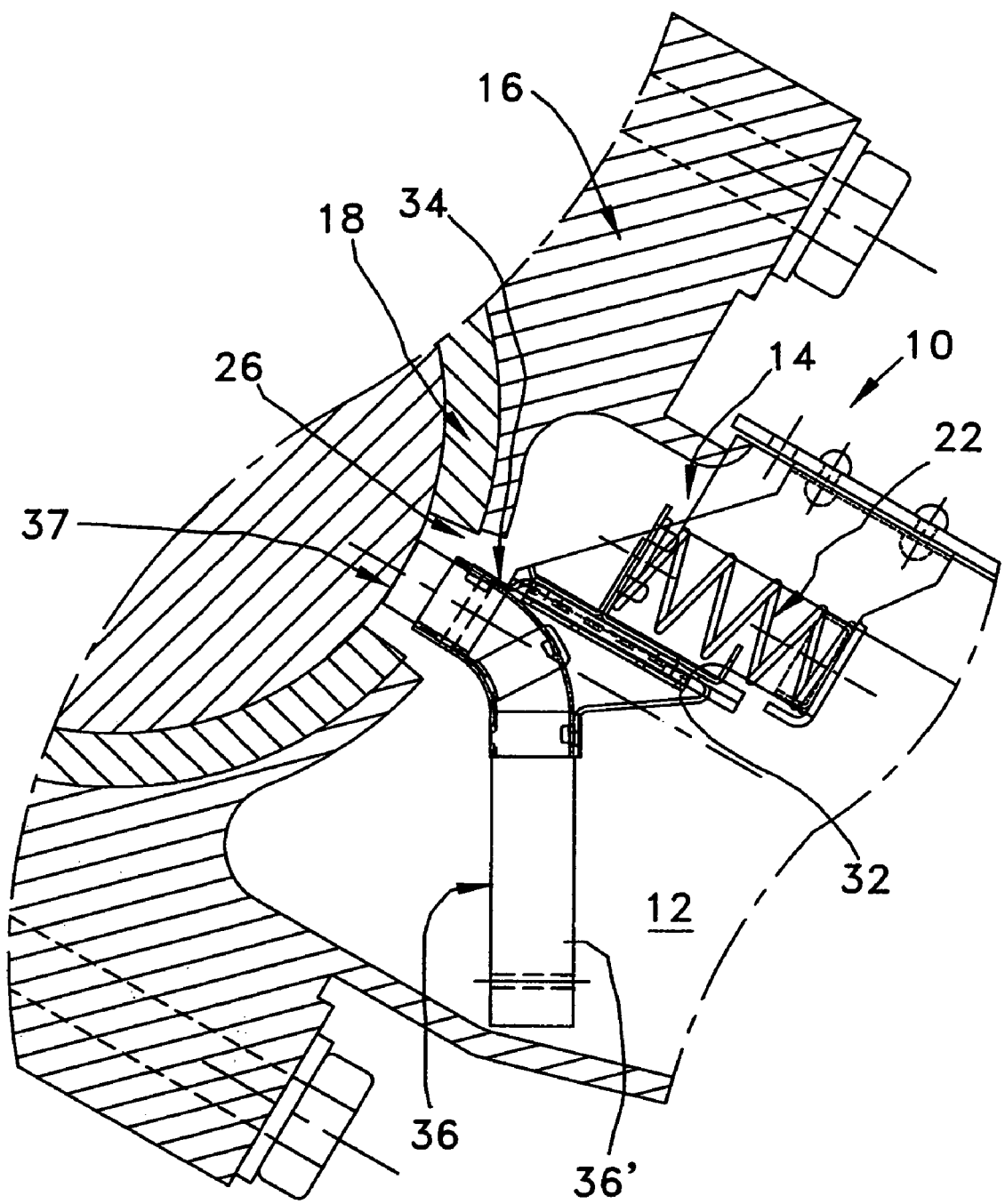
FIG. 1 is a partial vertical cross-sectional view of a prior-art locomotive traction support bearing and axle cap, and showing the prior-art lubricating system.

Referring now to the drawings in greater detail, and in particular to FIGS. 2-7, there is shown a first embodiment of the improved wick-lubricant delivery system for enhancing and optimizing lubricant flow to the face of the wick used to lubricate an axle-journal surface supported in a locomotive traction-motor friction support bearing. In accordance with this first embodiment, a passive inertia-activated slosh pump in the form of a piston-type pump assembly 40 is provided, and is vertically mounted to, and below, the wick carrier-assembly 14 via mounting bracket 40'. Mounting bracket 40' positions the pump assembly below the spring 22. The pump assembly 42 has a pump inlet valve 42' and a pump outlet valve 42". Projecting vertically downwardly from the inlet valve 42' is an inlet tube 44 having a lower inlet-opening 44' deeply submerged in the oil-reservoir 12, so that droplets of oil may be taken in through the inlet-opening 44' and delivered to the pump inlet valve 42' via the inlet tube 44. Projecting at a upward slope from the pump outlet valve 42" is an outlet-tube 46 having an upper outlet-opening 46'. The outlet-tube 46 is located exteriorly of the wick-holder, with the outlet-opening 46' thereof terminating at the wick-face 36' of the felt wick 36, so that droplets of oil taken up through the inlet-opening valve 44' and delivered to the pump inlet valve 42' via the inlet tube 44 are delivered to the wick face 36' during normal operation, as described hereinbelow, in order to supplement normal wick oil-delivery.

Figure 2:
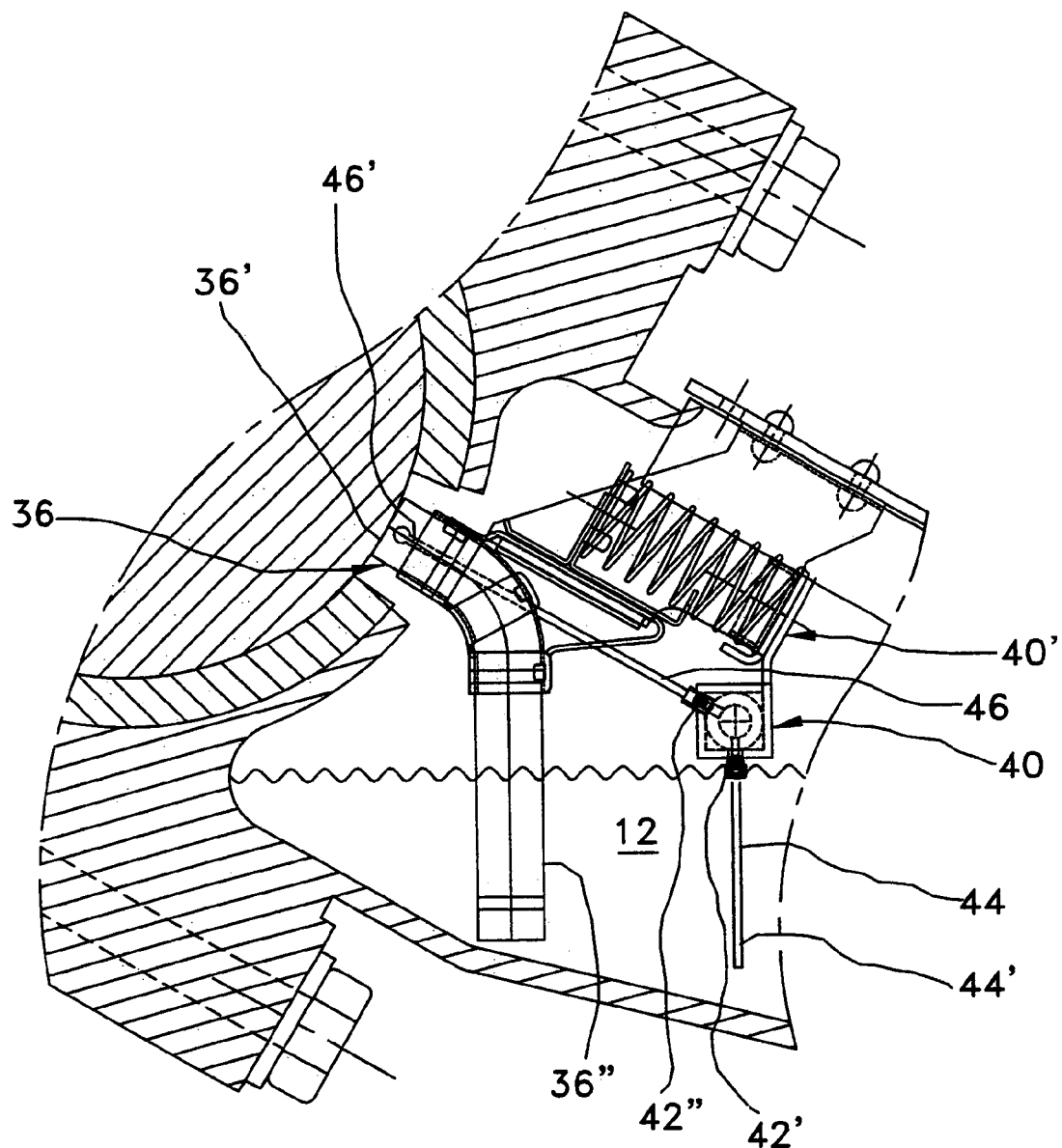
FIG. 2 is a partial vertical cross-sectional view of a locomotive traction support bearing and axle cap similar to FIG. 1, but showing the lubricating system of the first embodiment of the present invention that incorporates the passive, inertia-activated slosh pump of the invention for enhancing oil flow to the face of the central wick lubricator.

The passive inertia-activated slosh pump assembly 40 is best seen in FIGS. 3-7, and takes the form of a piston pump 50. The piston pump 50 has a main cylindrical housing 52 made of light-weight, low-wear material that reciprocatively mounts a piston 54. The piston 54 is made of high-inertia material, such as solid steel, and is biased by a spring 56. The piston 54 is caused to reciprocate in the cylinder due to vertical and lateral accelerations imposed upon the traction motor by rail irregularities encountered during normal operation. The reciprocation of the piston 54 causes oil in the oil reservoir 12 to be drawn in through the inlet valve 42' and output through the output valve 42" to the wick face 36' (FIG. 2). Movement of the piston 54 in a first direction against the spring 56, which direction is to the right when viewing FIG. 3 and, as explained above, is caused by lateral and vertical acceleration forces acting on the piston due to rail irregularities, causes oil droplets to be taken in through inlet valve 42', and movement in the opposite direction via the biasing spring 56 forces the oil out through the outlet valve 42", which outward movement is to the left when viewing FIG. 3.

Each of the inlet valve 42' and outlet valve 42" incorporates a ball check 60, 62, as best seen in FIGS. 5 and 6, respectively. The inlet valve 42 (FIG. 5) is provided with an outer cap 64 formed with an inlet hole, and defines an interior seat 64' for the ball 60, which ball 60 is normally biased outwardly against the seat 64' by a spring 66 to close off the inlet hole of the cap 64. The interior of the valve housing also defines passages 68' which permit the oil to bypass the ball check valve when the ball is unseated. The interior of the valve housing defines limit stops 68 against which the ball 60 abuts during its inward movement when the piston 54 moves during its intake stroke, as described hereinabove. The outlet valve 42" (FIG. 6) operates oppositely to that of the inlet valve, and is provided with an inner seat 70 against which the ball check 62 is seated during the piston intake-stroke for closing off the outlet of the pump, which ball is biased against the seat 70 by a spring 72. During the discharge stroke of the piston 54, the ball 62 is forced outwardly against the force of the spring 72, thereby opening and allowing oil to be pumped out through the outlet valve and to the wick face 36' via the outlet tube 46 described hereinabove.

Figure 3:
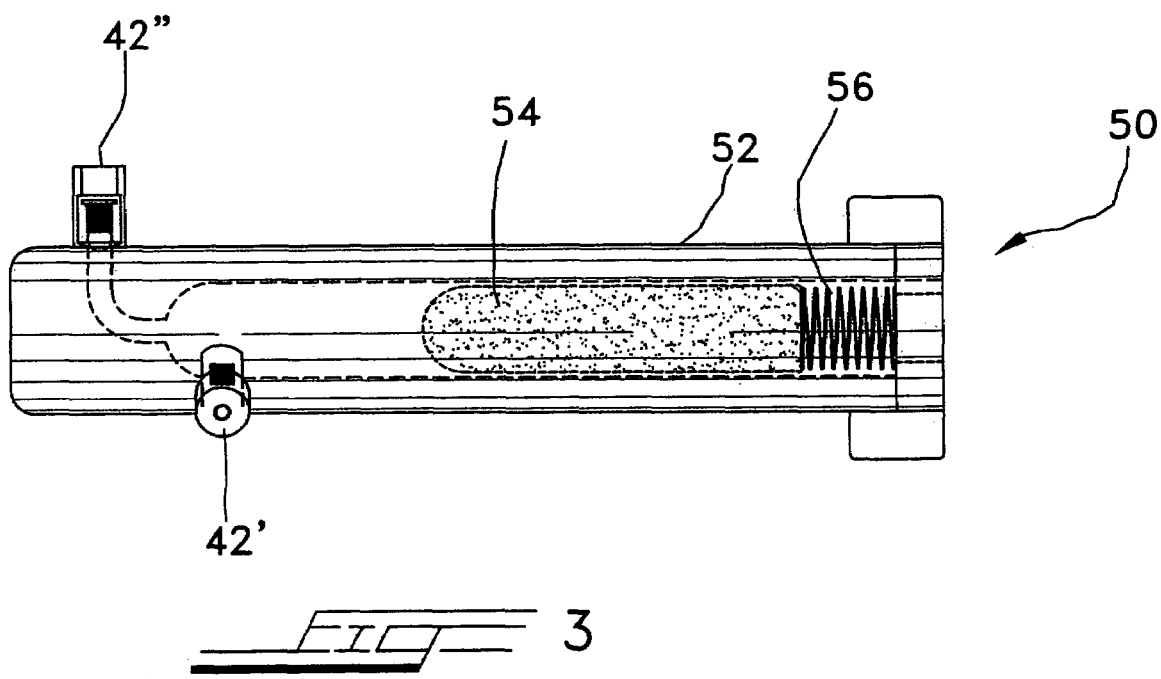
FIG. 3 is a side view, in partial cross section, showing the slosh pump of FIG. 2.
Figure 4:
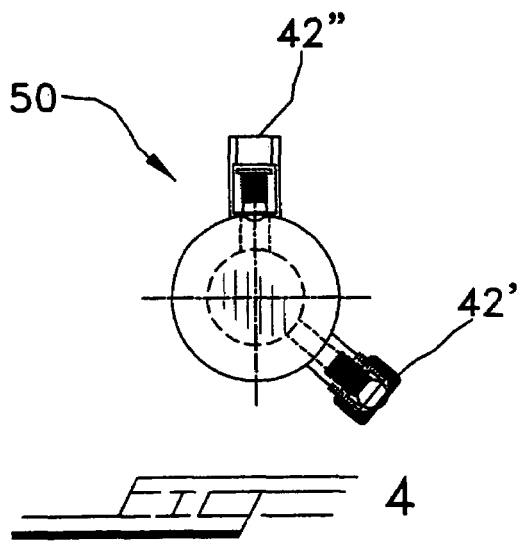
FIG. 4 is an end view thereof.
Figure 8:
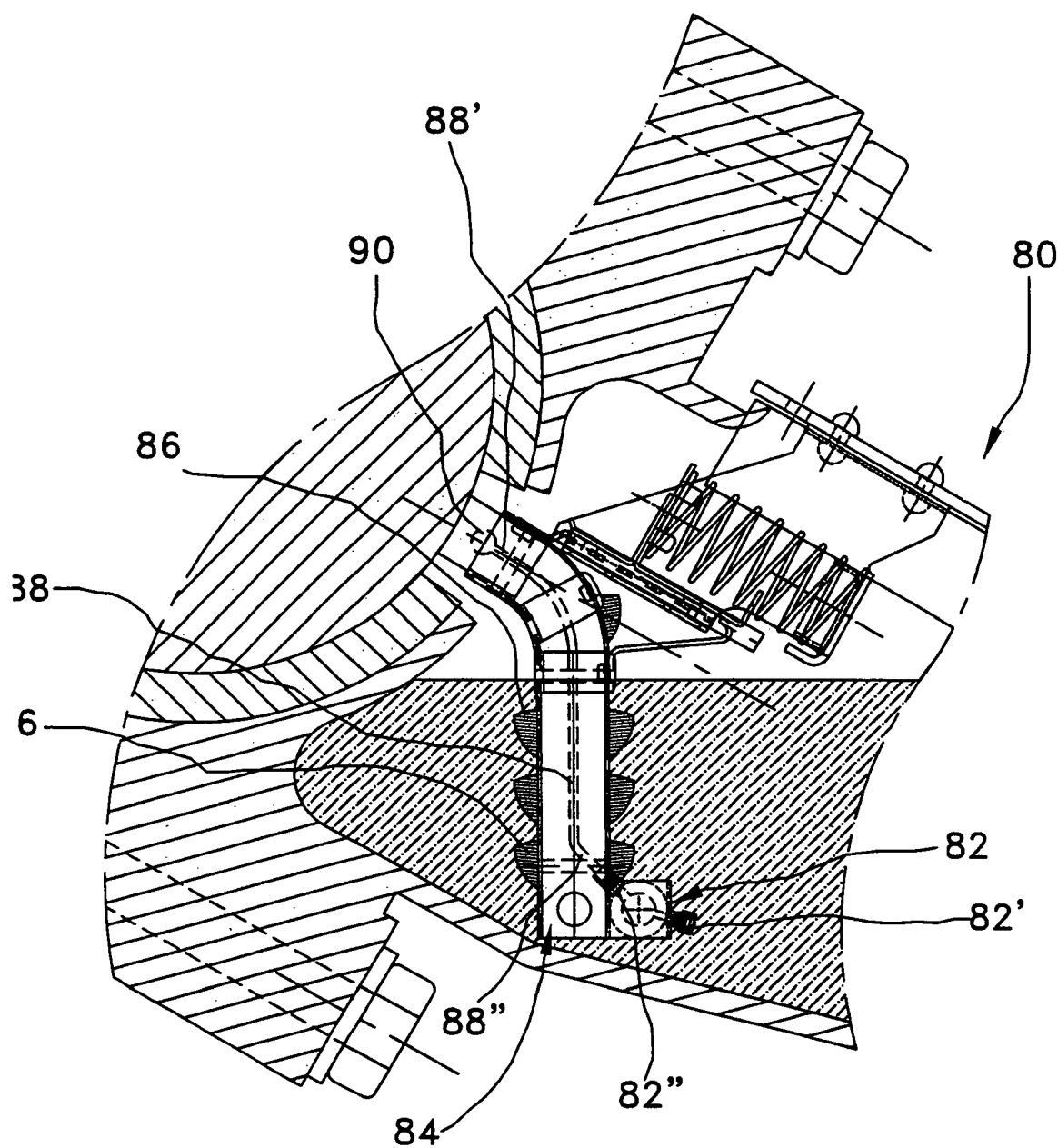
FIG. 8 is a partial vertical cross-sectional view of a locomotive traction support bearing and axle cap similar to FIG. 1, but showing the lubricating system according to a modification of the first embodiment in which the slosh pump of FIG. 3 is incorporated as part of a reservoir-pockets splash sleeve.
Figure 9:
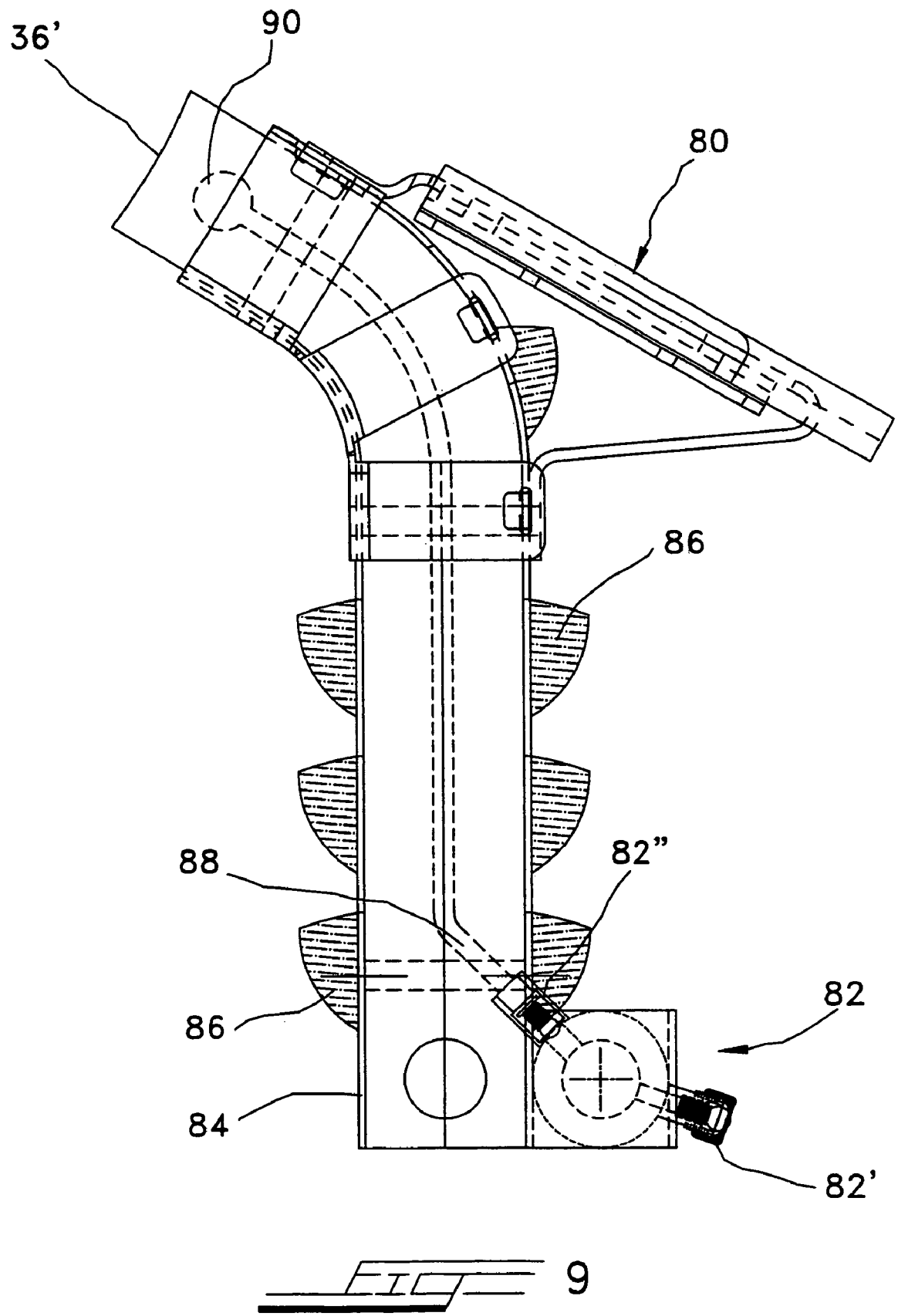
FIG. 9 is a side elevational view showing a wick holder with attached splash sleeve of FIG. 8 incorporating the slosh pump of FIG. 3.
Figure 10:
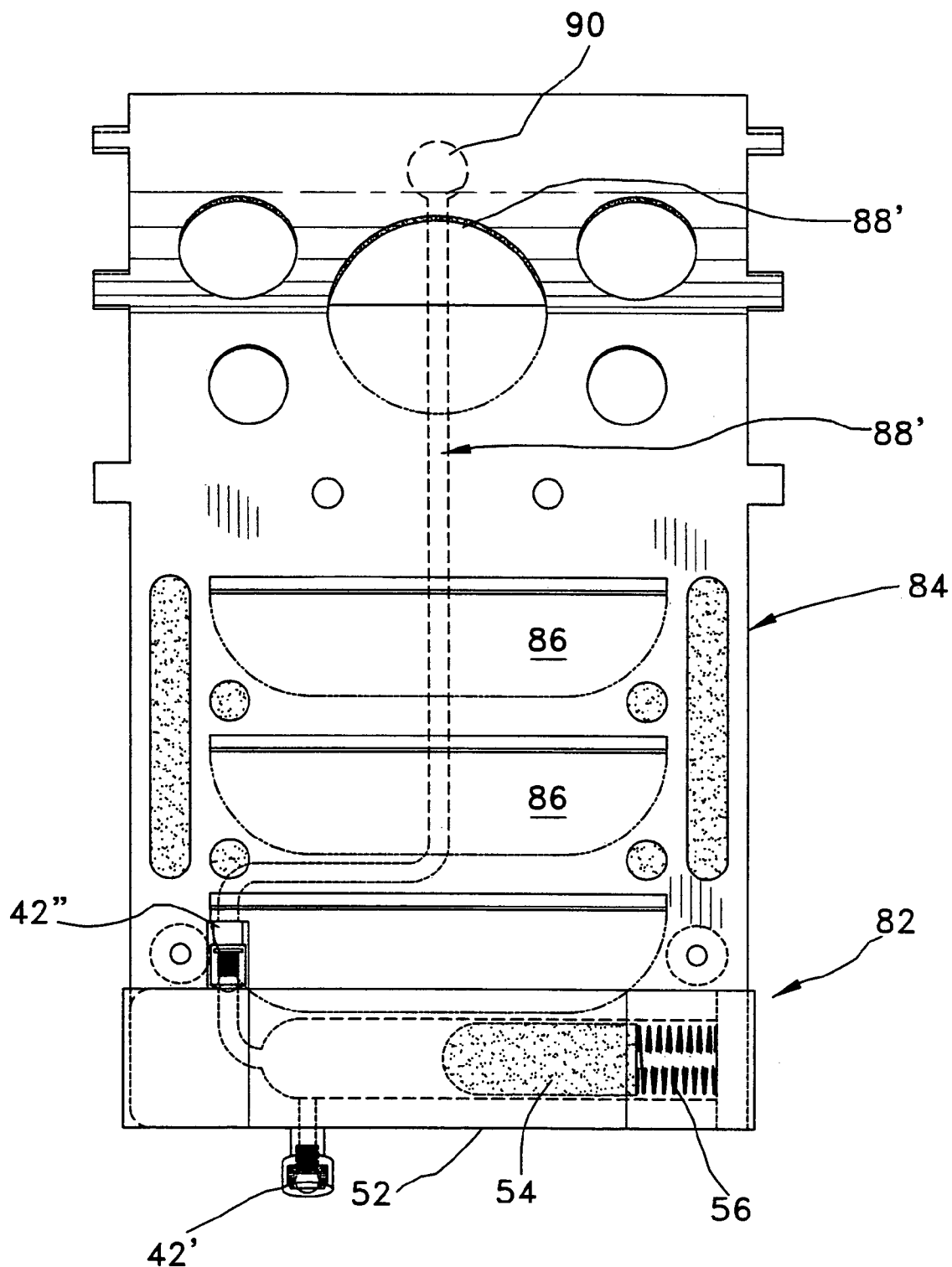
FIG. 10 is a front view thereof.

Referring now to FIGS. 8-10, there is shown a modification 80 of the first embodiment of the lubricating system of the invention in which the passive inertia-activated slosh pump of FIG. 3 is incorporated as part of a splash sleeve. The modification 80 utilizes a piston-type pump assembly 82 like that of FIGS. 3-7 but which is mounted to a splash sleeve 84 incorporating a plurality of reservoir-pockets or louvers 86 which are used for collecting oil that has been splashed during normal operation of the locomotive, as described in detail in above-mentioned copending application Ser. No. 11/284,635, which application is incorporated by reference herein. The splash sleeve 84 is mounted to the lower free end portion 36" (FIG. 2) of the felt wick 36 positioned in the oil-reservoir 12, and defines a hollow interior volume that telescopingly receives therein the lower end of the felt wick. The piston-type pump assembly 82 is similar to the piston-pump assembly of FIGS. 3-7, and includes a pump inlet valve 82' having a ball check and a pump outlet valve 82" having a ball check. Owing to the mounting of the pump assembly 82 to the lower end of the splash sleeve 84, the inlet valve 82' is substantially deeply submerged in the oil-reservoir 12, so that an inlet tube, such as the inlet tube 44 of the pump assembly 42 of FIGS. 3-7, is not required.

Projecting from the main housing of the pump assembly 82 is the pump outlet valve 82" from which projects an outlet-tube 88 having an upper outlet-opening 88'. The outlet valve 82" projects interiorly through the splash sleeve 84 and into the interior of the lower end portion of the wick lubricator, as seen in FIG. 8. An appropriately placed and sized opening is formed in the housing of the splash sleeve 84 through which the outlet valve 82" projects interiorly of the wick lubricator, with a juxtapositioned portion of the wick lubricator pad being cut out in order to accommodate the outlet-valve 82". The outlet-tube 88 is located interiorly of the wick-holder, and extends or runs vertically upwardly along the interior or center of the central wick-lubricator pad, with the outlet-opening 88' thereof terminating at the upper wick-face 36' of the wick pad 36. The outlet-tube 88 assumes the same shape or curvature as that of the wick lubricator itself. Preferably, a cavity or reservoir 90 is formed adjacent, and in close proximity, to the upper wick-face 36' into which the outlet-opening 88' of the outlet-tube 88 feeds, so that oil delivered through the outlet-tube 88 may be temporarily stored therein for providing a more consistent and optimized lubrication of the wick-face 36'.

Figure 11:
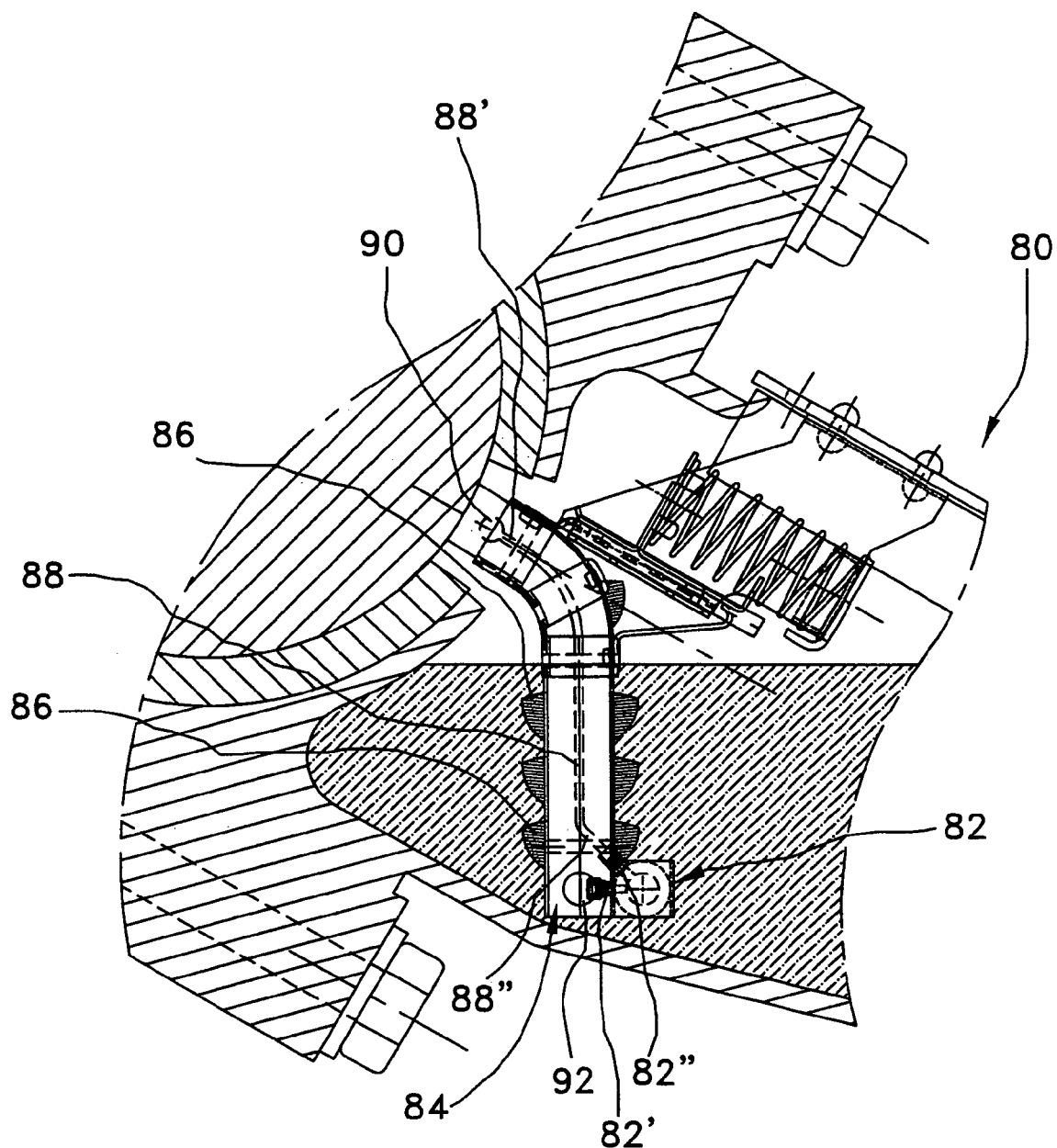
FIG. 11 is a partial vertical cross-sectional view of a locomotive traction support bearing and axle cap similar to FIG. 8, but showing the lubricating system of the invention according to another modification of the first embodiment in which the inlet of the slosh pump of FIG. 8 is located interiorly, rather than exteriorly, of the central wick lubricator.

The inlet-valve 82' with ball check of the pump assembly 82 of the modification 80 of FIGS. 8 and 9 may, alternatively, like the outlet-valve 82", be located interiorly of the lubricating wick pad, as seen in FIG. 11. In this case, the inlet-valve 82' extends substantially horizontally from the main housing of the pump assembly 82, and into the interior of the wick pad juxtapositioned thereat. The intake opening of the inlet-valve 82' extends to, and cooperates with, an interiorly-located pocket or cavity 92 that is formed in the interior of the lower end portion of the wick, by which oil is collected for supplying the intake opening of the inlet-valve 82'.

Whether the outlet valve 82", or both the outlet valve and inlet valve 82' project interiorly of the splash sleeve 92, appropriately-situated cutouts are provided in the lower portion 36" of the felt wick 36 in order to accommodate their interior protrusion. With regard to the outlet tube 88, it preferably extends between the two layers of the conventional felt wick 36, as would evident to one of ordinary skill in the art. The lower end portion 36" of the felt wick is also provided with a opening or void to allow for the sloped lower portion 88" of the outlet tube 88 to connect to the outlet valve 82".

Figure 12:
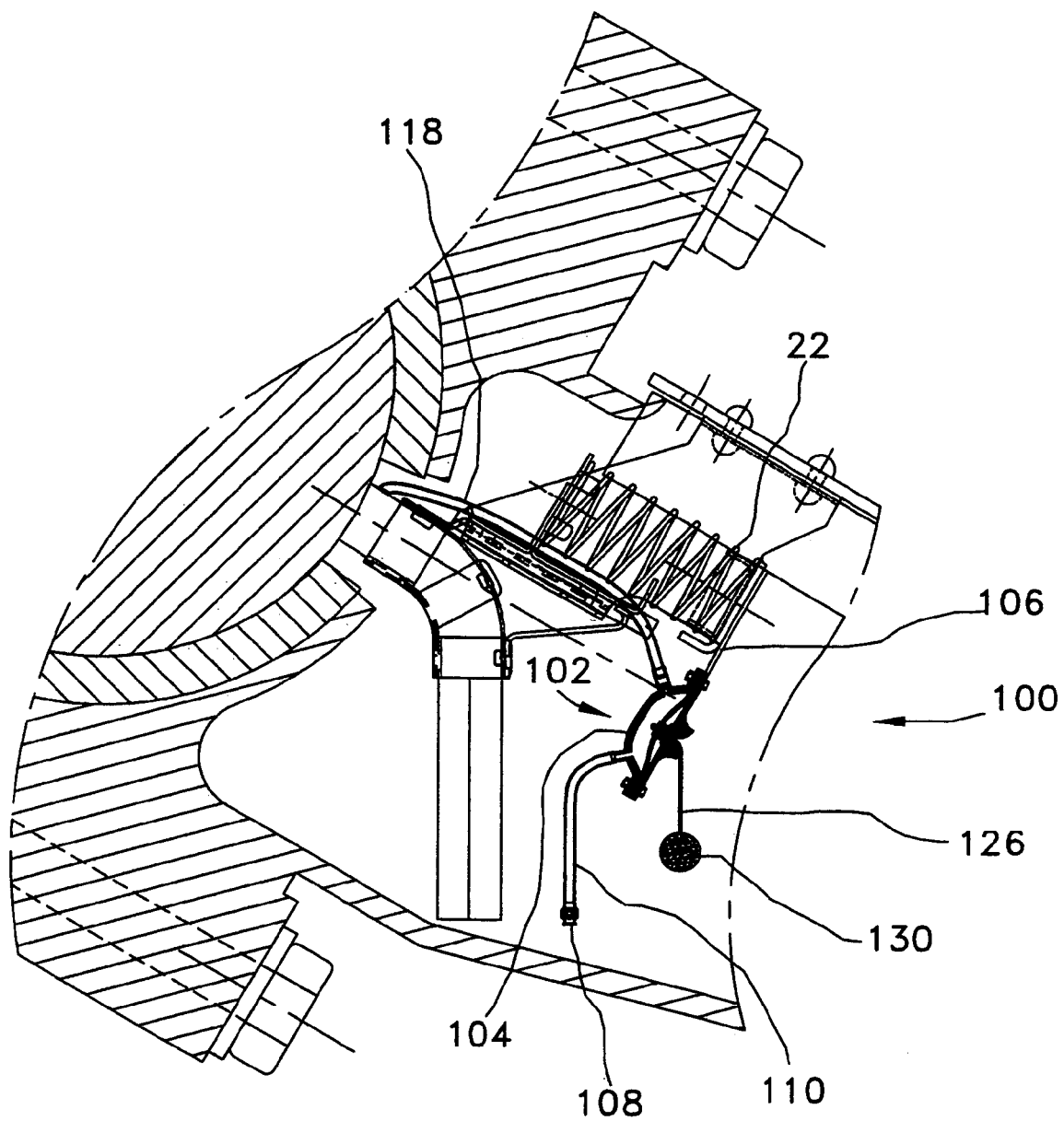
FIG. 12 is a partial vertical cross-sectional view of a locomotive traction support bearing and axle cap similar to FIG. 1, but showing the lubricating system according to a second embodiment of the present invention in which the slosh pump is diaphragm pump.
Figure 13:
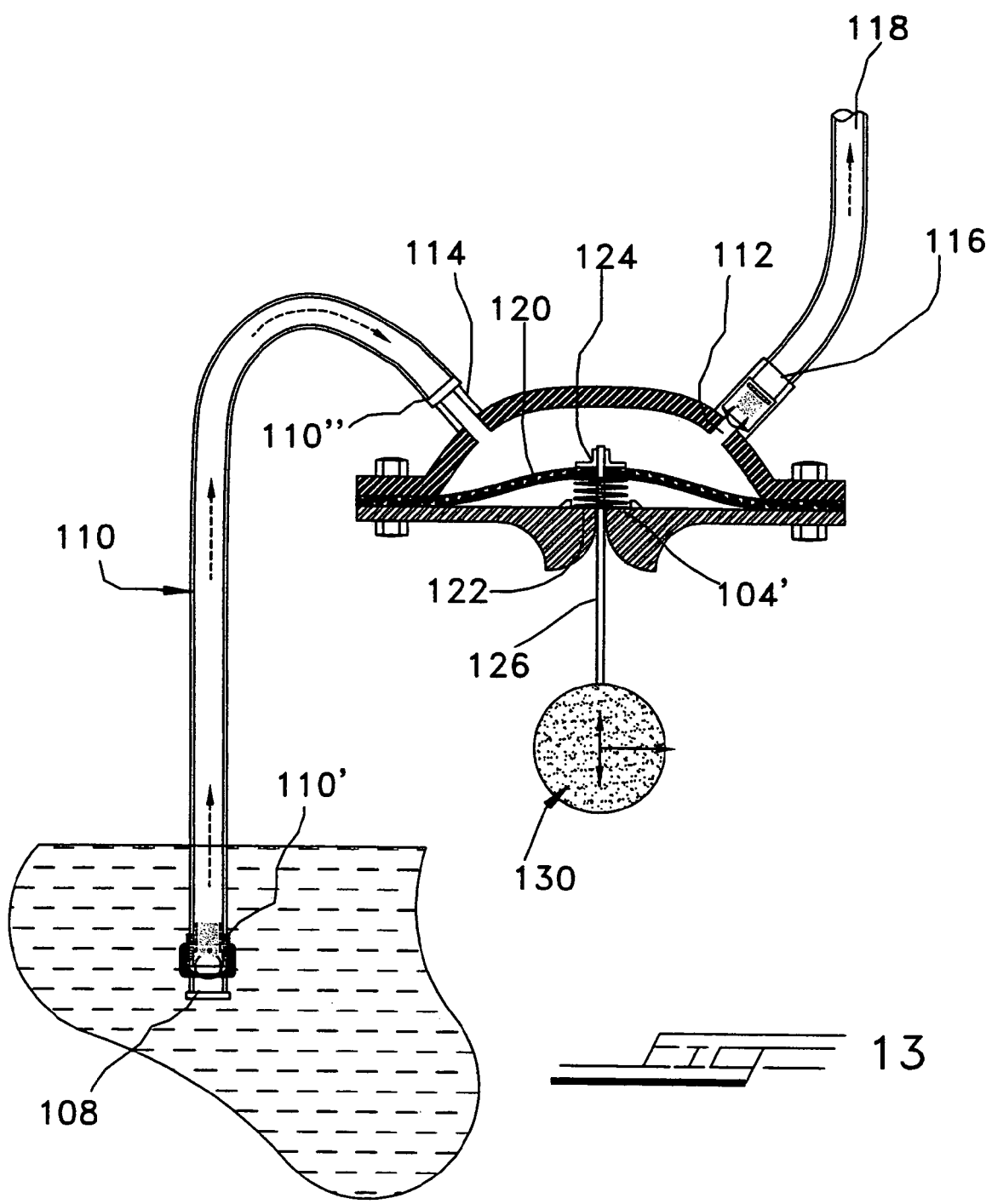
FIG. 13 is a detail view of the diaphragm pump of FIG. 12.

Referring now to FIGS. 12 and 13, there is shown a second embodiment 100 of the improved wick-lubricant delivery system for increasing lubricant flow to the face of the wick used to lubricate an axle-journal surface supported in a locomotive traction-motor friction support bearing. In this embodiment, the passive inertia-activated slosh pump is a diaphragm pump 102 instead of the piston-type pump of the first embodiment. The diaphragm pump 102 consists of a housing 104 vertically mounted to, and below, the wick-carrier assembly via mounting bracket 106, which housing defines an interior cavity for storing oil being pumped. Mounting bracket 106 positions the pump assembly below the spring 22. The housing 104 is provided with an inlet ball-check valve 108 that is mounted to a bottom open end 110' of an oil-pickup tube 110. The upper end 110" of the tube 110 is connected to a tubular intake 114 formed in the housing 104 of the diaphragm pump 102. The housing 104 also has an outlet opening 112 to which is coupled an outlet ball-check valve 116 to which is connected a pump-discharge tube 118 similar to the tube 46 of the first embodiment of FIGS. 1-7, which discharge tube 118 is located exteriorly of the wick-holder, with the upper outlet-opening thereof terminating at the wick-face of the felt wick, so that droplets of oil taken up by the pump are delivered to the wick face 36' during normal operation.

Interiorly of the housing there is located a conventional diaphragm 120 that is biased upwardly by a spring 122. Affixed to the upper surface of the diaphragm 120 is a flexible mounting stem or connector 124 which mounts a downwardly-projecting, elongated flexible cable or connector 126. The connector 126 projects exteriorly of the housing 104 via a lower opening formed in a lower section 104' of the housing. To the bottom end of the flexible connector 126 there is connected an inertial mass 130, which, together with the flexible connector 126, serves as a pendulum. Movement of the inertial mass 130, because of the lateral and vertical acceleration forces acting thereon due to rail irregularities, causes deflections of the spring 122 and diaphragm 120. The deflection of the diaphragm 120 in the downward direction against the spring 122 causes oil droplets to be taken in by oil inlet 108, while the upward deflective movement thereof in the opposite direction via the biasing spring 122 forces the oil out through the outlet valve 116.

The diaphragm pump 102 of the second embodiment of FIGS. 12 and 13 may also be mounted to a splash sleeve, in a manner similarly to that of the inertial piston pump of the first embodiment shown of FIGS. 8-11. In addition, it is within the scope and purview of the invention that, instead of a splash sleeve being used to mount the inertial pump to the lower end portion of the central lubricating wick, different mounts or sleeves may be used, whether they mount the passive inertia-activated slosh pump to the central lubricating wick or to the wick bracket assembly proper. In addition, although it is preferable that the discharge tube of the passive inertia-activated slosh pump extend at least partially interiorly and through the central lubricating wick for discharging oil droplets at the wick face when the inertial pump is mounted to the splash sleeve or other mount, it is possible to run the discharge tube exteriorly.

In all of the above-described embodiments, the slosh pump works in parallel, or in conjunction, with the capillary action of the wick in order to deliver oil to the interface between the wick face and the journal surface. It is also envisioned that, if the delivery rate of the slosh pump is equal to or greater than that of the wick, a modification may be employed where the wick tail is cut off, with the sustained oil delivery being dependant upon the slosh pump alone. In this modification, the wick serves as a reservoir and part of the delivery system.

In yet another modification shown in FIG. 13, with the volume of oil delivered to the journal surface no longer dependent upon the cross-sectional area of the wick body and face, the wick may be eliminated altogether in favor of the inertial pump oil-delivery system of the invention routed to a simple intake hole or lubricating opening 128 formed through the bearing 18 and its liner, whereby the entire surface-interface lubrication of the journal surface 37 is accomplished by the slosh pump 102 of FIG. 12, for example, with the slosh pump 102 being mounted directly to the carrier assembly 14, or otherwise mounted to the bearing axle cap 16, with its discharge tube 118 feeding directly into the intake hole or opening 128. In this embodiment, the elimination of the wick would also allow replacement of the wick window in the bearing cap and bearing liner with the opening 128. Instead of the diaphragm pump 102, the piston-type pump of FIG. 1 may also be used alone in accordance with this embodiment.

In all of the above-described embodiments and modifications, as a result of the increased oil-saturation of the wick, optimized amounts of oil are delivered to the axle-journal surface-area. This optimized amount of oil saturation and enhanced oil delivery provide better protection against axle-journal bearing failure in the event that a locomotive is used with diminished axle-journal oil levels. In addition, the temperature of the oil is reduced and the viscosity increased, to thus increase the rated load-capacity of the bearing, and to thus increase the tolerance of the bearing to minor surface imperfections. The optimized wick-saturation and oil delivered to journal lowers the wick-face temperature and reduces the rate of wick-face glazing, thereby extending the life of the wick. This enhanced wick-saturation and oil delivered to the journal also limit the ingress of external contaminants into the loaded journal areas, thereby reducing wear and extending the life of the bearings.

The particular type of inlet and outlet valves used in each version of the slosh pump may vary from that disclosed hereinabove. It is, also, preferable, though not requisite, that the inlet valve of each version of the slosh pump be similar in construction and of the same type as that of the outlet or discharge valve thereof.

While specific embodiments of the invention have been shown and described, it is to be understood that numerous changes and modifications may be made therein without departing from the scope and spirit of the invention.

What is claimed is:

1. In a lubricating system for lubricating an axle-journal surface mounted in a locomotive traction-motor support bearing comprising a lubricant reservoir, a wick holder assembly for mounting a central lubricating wick so that a lower portion of the lubricating wick is immersed in said lubricant reservoir and an upper wick-face portion of the lubricating wick is received in a central wick window for lubricating the axle-journal surface mounted by the support bearing of a railway locomotive traction motor, the improvement comprising:

a passive inertia-activated pump having a main housing having a hollow interior for temporarily storing lubricant to be pumped;

a mounting device for mounting said passive inertia-activated pump to a portion of said lubricating system;

said passive inertia-activated pump comprising an inlet submersed in said lubricant reservoir and an outlet, and an inertial mass that is set in motion in response to inertial resistance to the accelerations imposed upon the traction motor during normal operation, whereby, upon the motion of said inertial mass, lubricant is taken in from the lubricant reservoir via said inlet and delivered to said upper wick-face portion via said outlet in order to supplement normal lubricant-delivery by said central lubricating wick;

said outlet comprising an outlet valve, and a discharge tube having a first end fluidly connected with said outlet valve, and a second end located in close juxtaposition to said upper wick-face portion of said central lubricating wick;

said wick holder assembly further comprising a wick holder having an upper portion for mounting said upper wick-face portion to a central wick window, and a lower portion for mounting said lower portion of said lubricating wick in said lubricant reservoir;

said mounting device for mounting said passive inertia-activated pump to a portion of said lubricating system mounting said passive inertia-activated pump in close juxtaposition to said lower portion of said lubricating wick;

said mounting device for mounting said passive inertia-activated pump comprising a splash sleeve and having at least one lubricant-reservoir for temporarily storing lubricant therein and for delivering the lubricant to the lubricating wick, said splash sleeve being telescopingly mounted over an exposed lower portion of a central lubricating wick projecting downwardly from said wick holder;

said inlet of said passive inertia-activated pump being located one of: interiorly of said splash sleeve, and exteriorly of said splash sleeve; said outlet valve of said outlet being operatively associated interiorly of said splash sleeve, and said discharge tube of said outlet passing interiorly of both said splash sleeve and at least a portion of said lubricating wick; said second end of said discharge tube being located in close juxtaposition to said upper wick-face portion of said central lubricating wick interiorly thereof.

2. The lubricating system for lubricating an axle-journal surface mounted in a locomotive traction-motor support bearing according to claim 1, wherein said central lubricating wick is made of felt, and said discharge tube passing therethrough.

3. The lubricating system for lubricating an axle-journal surface mounted in a locomotive traction-motor support bearing according to claim 1, wherein said passive inertia-activated pump is a piston pump, and said inertial mass is the piston thereof.

4. The lubricating system for lubricating an axle-journal surface mounted in a locomotive traction-motor support bearing according to claim 1, wherein said passive inertia-activated pump is a diaphragm pump, said inertial mass comprising a weight operatively coupled to the diaphragm of said diaphragm pump; and a coupling component for coupling said weight to said diaphragm.

5. The lubricating system for lubricating an axle-journal surface mounted in a locomotive traction-motor support bearing according to claim 4, wherein said coupling component for coupling said weight to said diaphragm comprises a flexible connecting component for pendulously mounting said weight.

6. A method for supplementing the lubrication provided by a lubricating system of an axle-journal surface mounted in a locomotive traction-motor support bearing comprising a lubricant reservoir, a wick holder assembly for mounting a central lubricating wick so that a lower portion of the lubricating wick is immersed in the lubricant reservoir and an upper wick-face portion of the lubricating wick is received in a central wick window for lubricating the axle-journal surface mounted by the support bearing of a railway locomotive traction motor, comprising:

(a) operatively mounting to a portion of the lubricating system a passive inertia-activated pump having a main housing having a hollow interior for temporarily storing lubricant to be pumped;

(b) said step (a) comprising submerging the inlet of the passive inertia-activated pump in the lubricant reservoir;

(c) said step (a) comprising delivering the lubricant outflow from said passive inertia-activated pump to the upper wick-face portion in order to supplement normal lubricant-delivery by said central lubricating wick;

(d) said step (c) comprising setting in motion an inertial mass of said passive inertia-activated pump in response to inertial resistance to the accelerations imposed upon the traction motor during normal operation, whereby upon the motion of said inertial mass, lubricant is taken in from the lubricant reservoir via said inlet and delivered to said upper wick-face portion in order to supplement normal lubricant-delivery by said central lubricating wick.

7. A method for supplementing the lubrication provided by a lubricating system of an axle-journal surface mounted in a locomotive traction-motor support bearing according to claim 6, wherein said step (a) comprises operatively mounting a passive inertia-activated piston pump to the lubricating system.

8. A method for supplementing the lubrication provided by a lubricating system of an axle-journal surface mounted in a locomotive traction-motor support bearing according to claim 6, wherein said step (a) comprises operatively mounting a passive inertia-activated diaphragm pump to the lubricating system.

9. A method for supplementing the lubrication provided by a lubricating system of an axle-journal surface mounted in a locomotive traction-motor support bearing according to claim 6, wherein said step (c) comprises delivering the lubricant outflow through a discharge outlet conduit to the upper wick-face portion.

10. A method for supplementing the lubrication provided by a lubricating system of an axle-journal surface mounted in a locomotive traction-motor support bearing according to claim 9, wherein said step (c) comprises passing the discharge outlet conduit interiorly through at least a portion of the central lubricating wick.

11. The method for supplementing the lubrication provided by a lubricating system of an axle-journal surface mounted in a locomotive traction-motor support bearing according to claim 10, wherein said step (c) comprises delivering the lubricant outflow from said passive inertia-activated pump to an interior pocket formed in an upper portion of the lubricating wick at the wick face for accumulating the lubricant therein.

* * * * *